Patented Apr. 26, 1932

1,855,366

UNITED STATES PATENT OFFICE

FREDERICK W. SKIRROW AND GEORGE O. MORRISON, OF SHAWINIGAN FALLS, QUEBEC, CANADA, ASSIGNORS TO CANADIAN ELECTRO PRODUCTS COMPANY, LIMITED, OF MONTREAL, QUEBEC, CANADA

PROCESS OF MAKING ESTERS

No Drawing.  Application filed March 17, 1928. Serial No. 262,602.

This invention relates broadly to improvements in the manufacture of esters by reaction of acetylene and carboxylic acids, and more particularly to the manufacture of the vinyl esters, and is an improvement on the process disclosed in U. S. Patent No. 1,638,713, granted August 9th, 1927. The primary object of the invention is to enable high yields of vinyl esters to be obtained directly by reaction of acetylene and carboxylic acids and with production of only a minimum of diesters as by-products.

According to the aforesaid patent, vinyl esters are obtained largely by a two-stage operation. In the first stage, the vinyl esters are produced directly by reaction of acetylene and carboxylic acids in presence of a suitable catalyst, the reaction also producing material proportions of diesters which are later decomposed to vinyl esters and aldehydes. The catalyst used is prepared in the acid by precipitation of a salt of mercury with sulphuric acid.

It has now been discovered that, in the manufacture of vinyl acetate, the reaction between acetylene and acetic acid is extremely sensitive to temperature and other conditions, such as the state or nature of the catalyst.

The present invention, therefore, relates particularly to those conditions of temperature, apparatus, catalyst and the like which produce high and commercially economical yields of vinyl acetate with only a relatively small yield of diester.

According to the present invention, formation of the catalyst is initiated by precipitating an acetic acid salt of mercury in solution in acetic acid, by addition of a body containing free sulphur trioxide, examples of such bodies being gaseous sulphur trioxide, sulphuric anhydride, fuming sulphuric acid or oleum. The term "sulphur trioxide" as hereinafter used will be understood to be without limitation as to the manner of introduction, i. e., whether gaseous, liquid, solid, or in solution as in fuming sulphuric acid.

The mercury salt used may be externally prepared or prepared in the acetic acid by introducing an oxide of mercury, which reacts with the acid to produce an acetate, which is then precipitated by addition of sulphur trioxide, preferably previously treated with acetic acid or acetic anhydride under suitable conditions to give acetyl sulphuric acid. From observation of the results obtained the mechanism of the reaction may be somewhat as follows:—

Sulphuric trioxide combines at ordinary and low temperatures with acetic acid to produce acetyl sulphuric acid, although depending on the conditions of temperature some sulphoacetic acid may also be produced. It is known from the work of van Peski (Rec. Trav. Chim. 1921, 40, pages 103–118 and Chem. Zentralblatt 1921, 111, page 609) that at low temperatures sulphur trioxide and acetic acid combine to form acetyl sulphuric acid, $CH_3.CO.O.SO_3H$, while at high temperatures sulphoacetic acid

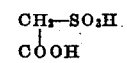

is predominantly formed. Van Peski also shows the transition of acetyl sulphuric acid into sulphoacetic acid. In one hour at 70° C. the transition is 72.5% and in three hours, 88.3%. It is well known that the velocity of such reactions is materially reduced by lowering the temperature. At 20° C. acetyl sulphuric acid is substantially stable. On the addition of the sulphur trioxide-acetic acid reaction product to the mercuric salt dissolved in acetic acid a precipitate is produced, which body is catalytic or becomes so on the passage of acetylene.

At temperatures between 20° and 60° C. the acetylene absorption reaction proceeds smoothly and with a satisfactory yield of vinyl acetate. A very large amount of the ester per pound of catalyst is produced as compared to results previously obtained, this amounting to as much as 150 pounds per pound of the mercury oxide used. Such results are obtained primarily with the use of sulphuric anhydride and fuming sulphuric acid containing a large excess of free sulphur trioxide, and lesser yields per pound of mercury are obtained by the use of sulphuric acid alone. It may be pointed out, however, that to produce a minimum of the diester the temperature during the acetylene introduction must be carefully controlled within predetermined limits and should preferably not exceed 60° C.

In the preparation of the catalyst, the sulphur trioxide, this may be added directly to a mixture of acetic acid and dissolved mercury acetate, or may be first of all reacted in a suitable manner with the acetic acid, which is then added to a solution of the mercury salt in acetic acid. The precipitant is preferably used in excess of the amount required for actual precipitation of the mercury salt, etc. In the formation of the precipitant using gaseous sulphur trioxide or fuming sulphuric acid, excesses of 1% and 1½% respectively based on the amount of acetic acid have been found satisfactory, but there may be variation both above and below these percentages from practically no excess up to an amount considerably above 1% or 1½%—say to 5%.

The temperatures prevailing during preparation of the mercury-acetate solution and of the precipitant and also during the precipitation of the catalyst may be varied in each case through a very wide range.

The precipitated material thus formed is found to be in very finely divided and reactive form and upon passage of acetylene gas into the reaction mixture under proper conditions very good yields of vinyl ester are obtained.

In order to obtain the best results in manufacture of the vinyl ester, the rate of supply of the acetylene gas should be greatly in excess of the rate of fixation, so that the escaping excess will remove the formed vinyl acetate from contact with the acetic acid as soon as possible; also the temperature of the reaction has a very important bearing on the yield. In general terms, the temperature should be below that favorable to a good yield of ethylidene diacetate; for instance, the best temperature for production of venyl acetate with a catalyst precipitated by addition of gaseous sulphur trioxide or fuming sulphuric acid is between 20° and 60° C., preferably between 30° and 50° C. (but may be as much below 20° as is productive of satisfactory results), while the best temperature for production of the ethylidene diacetate using a similar catalyst is between 70° and 100° C., preferably around 80° C. The desired reaction temperature is maintained by heating or cooling as necessary, the necessity depending upon the chosen temperature and the heat lost by radiation, etc. In large-scale operations where the heat loss is small relatively to the amount of reaction liquor, cooling will generally be necessary, and in small-scale operations the reverse.

The escaping excess of acetylene entrains some of the acetic acid, most of the formed vinyl acetate and at times a trace of the formed diacetate, and is passed through a condenser. The condensate is passed to a continuous column still, the base of which is heated to such temperature that the vinyl acetate distils off continuously and as completely as possible and is condensed and collected separately. The residue of acetic acid and any small amount of vinyl acetate that may remain may be returned into the reaction. The acetylene gas escaping from the condenser may carry some vinyl acetate and, to remove this ester, the gas may be passed through a brine condenser, scrubber or other suitable apparatus for recovery of the ester. The gas may then be returned into the reaction.

The material used in construction of the reaction vessel and condenser system is of importance since certain products which may be formed and carried back into the reaction vessel will inhibit the reaction. Excess of iron or copper is detrimental but small amounts of these metals dissolved in or resulting from reaction with the acetic acid may be removed by precipitation with sulphuric or other acid, as may be best suited, or by distillation or other means. These conditions indicate the use of special iron alloys of high silicon content or the newer acid-resisting alloys, in order to reduce or prevent formation of undesirable impurities. If apparatus of enamelware, earthenware or glass is used, contamination with formed impurities as above indicated is, of course, avoided.

The amount of catalyst present at the outset of the reaction is found to be of relatively small importance. An amount as low as 1% based on the acetic acid has been found economical and satisfactory.

The following examples serve to illustrate methods of practising the invention, but it will be understood that the invention is not limited to the materials, proportions, conditions or apparatus disclosed. Throughout the examples, the parts given are by weight and the reactions are conducted in closed kettles of high silicon iron, known in the trade as "Duriron".

*Example I*

20 parts of mercuric oxide is dissolved in 2000 parts of glacial acetic acid and to this is added at 85° C., 276 parts of precipitant formed by reacting 34 parts of sulphur trioxide with 242 parts of glacial acetic acid at a temperature of approximately 20° C. The mixture is brought to approximately 25° C. and a great excess of acetylene gas is passed through, the temperature being allowed to rise to 35° C., with an average of approximately 34° C. Reaction takes place with production of vinyl acetate and a small amount of ethylidene diacetate. The excess of acetylene is allowed to escape from the reaction vessel and carries with it most of the vinyl acetate and some acetic acid. The gas and entrained vapors are passed through a water condenser maintained at such temperature that the acetic acid and most of the vinyl acetate condense out. This condensate is run to a continuous column still heated at the bottom to such temperature that the vinyl acetate distils off and is collected separately from the acetic acid. The acetic acid from the base of the column runs to a pot still and is continuously distilled and returned to the reaction vessel. Fresh acetic acid is also added to replace that removed as ester. The acetylene leaving the condenser already referred to is passed through a second condenser, preferably brine-cooled, for separation of any vinyl acetate not collected in the first condenser, and the acetylene is returned to the reaction vessel. At the end of from ten to twelve hours, the rate of acetylene absorption will commence to diminish, owing to reduction of the catalyst, and at this time the yield of vinyl acetate is approximately 70% of theoretical, calculated on the acetic acid combined, and 78% on the acetylene. A small percentage of the vinyl acetate remains in the reaction kettle, from which it is recovered by distillation under suitable conditions. The formed ethylidene diacetate which accounts for the remainder of the acetic acid combined remains in the kettle liquors. 115 parts of vinyl acetate are produced per part of mercury oxide used.

*Example II*

The same conditions, methods and proportions in Example I are used, except that the sulphur trioxide is dissolved in the acetic acid at a temperature of approximately 115° C. and the temperature of the acetylene reaction is allowed to rise to 45° C. during the latter part of the acetylene introduction, showing an average temperature of approximately 36.5° C. The vinyl acetate yield based on the acetic acid is increased to approximately 76%. The yield based on the acetylene is approximately 78%. 80 parts of vinyl acetate are produced per part of mercury oxide used.

*Example III*

The same conditions, methods and proportions as in Example II are used, except that the mercuric oxide and the sulphur trioxide are both dissolved at temperatures of approximately 45° C. 110 parts of vinyl acetate are produced per part of mercury oxide used. The yield of vinyl acetate on acetic acid is 79%; on acetylene, 76%.

*Example IV*

The same conditions, methods and proportions are used as in Example I, except that the sulphur trioxide is dissolved in the acetic acid at approximately 45° C. and the temperature allowed to run up to 45° C., during the latter part of the acetylene introduction showing an average of approximately 40° C. The yields on the same bases as before are approximately 81% on acetic acid, 78% on the acetylene. The make is 108 parts of ester to one of mercury oxide.

*Example V*

20 parts of mercuric oxide is dissolved in 1800 parts of glacial acetic acid at approximately 45° C. and cooled to 20° C. 105 parts of glacial acetic acid is cooled to 17° C. and 65 parts of sulphur trioxide is run in very slowly with stirring and cooling to bring the temperature below 0° C. The bulk of the trioxide is added at temperatures between 0° C. and 5° C. 85 parts of this acid is diluted with 200 parts of glacial acetic acid at 17° C. and is added to the mercuric acetate solution. The temperatures during the acetylene run range between 28° C. and 45° C. with an average of approximately 35° C. The yields on the same bases as previous examples are approximately 79% and 77%. 136 parts of vinyl acetate are made per part of mercury oxide.

*Example VI*

The mercuric acetate solution is prepared as in Example III and 34 parts of sulphur trioxide is passed in slowly with efficient stirring at a temperature of 20° C. Acetylene is passed in at temperatures ranging from 27° C. to 45° C.—average 35° C. The yield is approximately 72% in each case. 124 parts of vinyl acetate are produced per part of mercury oxide. A larger amount of ethylidene diacetate is made utilizing catalyst made in this way than in the previous runs.

The process may be made continuous by withdrawing a part of the reaction liquor from the reaction vessel, when the rate of acetylene absorption falls off to an uneconomical extent, and replacing it with fresh catalyst made in accordance with the process or in any other suitable manner, great care being taken to preserve the correct proportions of the reacting mixture. As an illustration of continuous operation the following example is given.

*Example VII*

20 lbs. of mercury oxide is dissolved in 2000 lbs. of glacial acetic acid and 34 lbs. of $SO_3$ is reacted with 240 lbs. acetic acid at 47° C. added at 85° C. Acetylene is circulated in the manner described in previous examples covering batch runs.

When the absorption of acetylene is down to, say, 90 cu. ft. in ten minutes, sufficient kettle liquor is withdrawn so that when replaced by fresh catalyst and acetic acid the acetic acid content of the kettle remains at 40% to 45%. The kettle is cooled to 30° C. and catalyst addition is made as follows;—5 lbs. of mercury oxide is dissolved in 100 lbs. glacial acetic acid and 6 lbs. of $SO_3$ is reacted with 42 lbs. of acetic acid at 47° C. and added at 85° C. and run into the kettle. This operation is repeated when the absorption again falls to 90 cu. ft.

Throughout the run the temperature is maintained so that the absorption is about 180 cu. ft. in ten minutes; this means a temperature range of 30° to 48° C. This continuous procedure gives a make of vinyl acetate of at least 80 lbs. per pound of mercury oxide and the yield of acetylene to vinyl acetate is 75%, and of acetic acid to vinyl acetate 81%.

The remainder of the acetic acid reacting has been converted into ethylidene diacetate and is found in the liquor withdrawn from the kettle. This also contains, besides acetic acid and spent catalyst, about 15% to 20% of vinyl acetate. The acidity as mineral acid in this material is preferably neutralized with calcium or sodium acetate before recovery by distillation. This treatment prevents the tendency for the vinyl acetate to be converted into ethylidene diacetate when heated, by its combination with acetic acid.

In the foregoing examples, it will be observed that it appears as if acetyl sulphuric acid is desirable not only as the precipitant for the mercury salt but is furthermore desirable in small quantities during the reaction with acetylene in order that high yields of the vinyl ester be produced and that a large amount of ester be produced per pound of mercury oxide used. It will be noted from the foregoing that many times more of the vinyl ester is produced per pound of mercury than by any previous method disclosed. Although acetyl sulphuric acid seems to be the desirable material, some particular virtue resides in the method of its formation, if it is in fact formed, inasmuch as if acetyl sulphuric acid is made by treating acetic anhydride with sulphuric acid that much poorer results are obtained than those outlined above. This may be in part due to the incomplete reaction of the acetic anhydride on the sulphuric acid under the conditions used. Furthermore, it may be pointed out that, if sulphuric acid is used in place of sulphuric anhydride, much poorer results are obtained not only in yield, but the amount of ester formed per part of mercury oxide used drops to below 20 parts, and a considerable amount of tarry material is also formed.

The novelty in the process, therefore, consists in the utilization of sulphuric anhydride in some form as outlined and the carrying out of the reaction for production of vinyl esters at a sufficiently low temperature so that the formation of the diester is reduced to a satisfactory minimum. In utilizing fuming sulphuric acid, it may be pointed out further that better results are obtained the higher the concentration of $SO_3$ present, and this should be preferably 65% to 70%, or over.

Various modifications may be introduced in the method of formation of the catalyst, and the precipitation of the same, and it is understood that the invention is not limited or circumscribed by the methods disclosed, or furthermore, by any theories advanced as to the mechanism of the reaction.

The process may also be employed for manufacture of ethylidene diacetate by maintaining higher temperature as already indicated and for manufacture of esters, particularly the diesters, from other carboxylic acids, particularly the diesters.

Having thus described our invention, what we claim is;—

1. A process of making vinyl acetate, which comprises passing a great excess of acetylene gas into acetic acid in presence of a catalyst with entrainment in the escaping excess acetylene of part of the acetic acid, most of the formed vinyl ester and some of the formed diester, subjecting the gas and vapour to a condensing operation and distilling the condensate at such temperature that the vinyl ester is separated from the diester and acetic acid, the catalyst being the result of reacting together mercuric acetate in solution in acetic acid and the reaction product of sulphur trioxide and acetic acid.

2. A process according to claim 1 in which the mercury catalyst is present in amount equivalent to 1% to 3% of mercuric oxide based on the amount of acetic acid.

3. A process according to claim 1, in which the reaction of sulphur trioxide and acetic acid is conducted at a temperature between slightly below 0° C. and 115° C.

4. A process according to claim 1, in which the sulphur trioxide acetic acid reaction product is reacted with the mercuric acetate solution at such temperature as to avoid formation of material amounts of sulphacetic acid.

5. A process according to claim 1, in which the mercuric acetate solution is obtained by reacting together acetic acid and mercuric oxide at a temperature between room temperature and approximately 45° C.

6. A process according to claim 1, in which the sulphur trioxide is present in excess of that required to cause precipitation of all the mercuric acetate.

7. A process according to claim 1, in which the gas and residual entrained vapours are subjected to a second condensing operation at lower temperature than the first for separation of any remaining vinyl ester.

8. A process according to claim 1, in which the sulphur trioxide-acetic acid reaction is conducted at a temperature between slightly below 0° C. and approximately 45° C.

9. A process of making vinyl acetate, which comprises reacting together acetylene gas and acetic acid in presence of a catalyst at a temperature between 20° and 60° C., the catalyst being the result of reacting together sulphur trioxide, acetic acid and mercuric acetate in solution in acetic acid.

10. A process of making vinyl acetate, which comprises reacting together acetylene gas and acetic acid in presence of a catalyst at a temperature between 20° and 60° C., the catalyst being the result of precipitating with an excess of sulphur trioxide, mercuric acetate in solution in acetic acid in amount equivalent to approximately 1% to 3% of mercuric oxide based on the acetic acid.

11. A process of making vinyl acetate, which comprises reacting together acetylene gas and acetic acid in presence of a catalyst, being the result of reacting together mercuric acetate in solution in acetic acid and the reaction product of sulphur trioxide and acetic acid.

12. A process according to claim 11, in which the reaction of sulphur trioxide and acetic acid is conducted at a temperature between slightly below 0° C. and 115° C.

13. A process according to claim 11, in which the reaction of sulphur trioxide and acetic acid is conducted at a temperature between slightly below 0° C. and approximately 45° C.

14. A process according to claim 11, in which the mercuric acetate solution is obtained by reacting together acetic acid and mercuric oxide at a temperature between room temperature and approximately 45° C.

15. A process according to claim 11, in which the sulphur trioxide is present in excess of that required to cause precipitation of all the mercuric acetate.

16. A process according to claim 11, in which the acetylene gas is supplied greatly in excess and the temperature of the acetylene-acetic acid reaction is maintained between 20° and 60° C. and the formed vinyl ester removed from contact with acid and catalyst by entrainment in the escaping excess acetylene.

17. A process of making vinyl acetate which comprises reacting together acetylene gas and acetic acid in presence of a catalyst resulting from precipitating mercuric acetate with acetyl sulphuric acid.

18. A process of making vinyl acetate, which comprises passing a great excess of acetylene gas into acetic acid in presence of a catalyst resulting from precipitating mercuric acetate with acetyl sulphuric acid, and removing the formed vinyl ester from the reaction in the escaping excess of acetylene.

19. A process according to claim 17, in which the temperature of the acetylene absorption reaction is maintained below approximately 60° C.

20. A process of making vinyl acetate, which comprises reacting together acetylene gas and acetic acid in presence of a catalyst composed initially of acetyl sulphuric acid and the reaction product of acetyl sulphuric acid and mercuric acetate.

21. A process of making vinyl acetate, which comprises passing a great excess of acetylene gas into acetic acid in presence of a catalyst composed initially of acetyl sulphuric acid and the reaction product of acetyl sulphur acid and mercuric acetate.

22. A process according to claim 20, in which the temperature of the acetylene absorption reaction is maintained below approximately 60° C.

23. A process of making vinyl esters, which comprises passing acetylene into an aliphatic mono-carboxylic acid in presence of a catalyst being the result of reacting together a mercury salt of the carboxylic acid and an excess of the reaction product of sulphur trioxide and the carboxylic acid used.

24. A process of making vinyl esters, which comprises passing acetylene into an aliphatic mono-carboxylic acid in presence of a catalyst being the result of reacting together a mercury salt of the carboxylic acid in solution in the acid and an excess of the reaction product of the acid and sulphur trioxide.

25. A process of making esters from carboxylic acids, which comprises passing acetylene into an aliphatic mono-carboxylic acid in presence of a catalyst resulting from reacting together a mercury salt of the carboxylic acid and the reaction product of sulphur trioxide and the carboxylic acid used.

26. A process of making esters of acetic acid, which comprises passing acetylene gas into acetic acid in presence of a catalyst being the result of reacting together mercuric acetate in solution in acetic acid and the reaction product of sulphur trioxide and acetic acid obtained at temperatures below approximately 45° C.

27. A process of making esters of acetic acid, which comprises passing acetylene gas into acetic acid in presence of a catalyst being the result of reacting together acetyl sulphur acid and mercuric acetate.

In witness whereof, we have hereunto set our hands.

FREDERICK W. SKIRROW.
GEORGE O. MORRISON.